No. 721,426. PATENTED FEB. 24, 1903.
F. E. COLLINS.
OIL FILTERING AND OILING SYSTEM.
APPLICATION FILED DEC. 7, 1901.
NO MODEL.
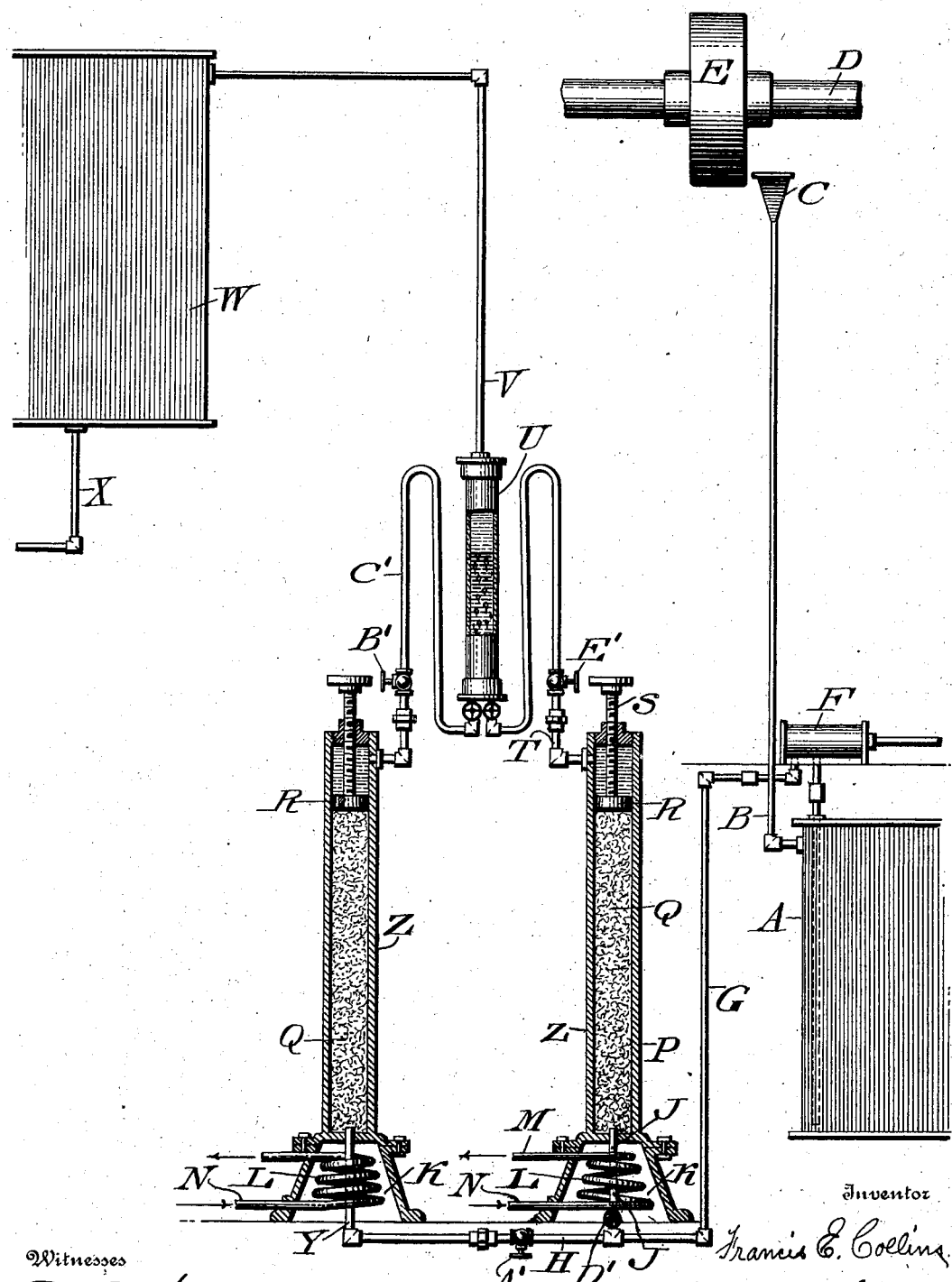

UNITED STATES PATENT OFFICE.

FRANCIS E. COLLINS, OF CONSHOHOCKEN, PENNSYLVANIA.

OIL-FILTERING AND OILING SYSTEM.

SPECIFICATION forming part of Letters Patent No. 721,426, dated February 24, 1903.

Application filed December 7, 1901. Serial No. 85,022. (No model.)

*To all whom it may concern:*

Be it known that I, FRANCIS E. COLLINS, a citizen of the United States, residing at Conshohocken, in the county of Montgomery, State of Pennsylvania, have invented a new and useful Improvement in Oil-Filtering and Oiling Systems, of which the following is a specification.

My invention relates to an improvement in an oil-filtering and oiling system; and it consists in providing a pressure-chamber through which the oil must pass and means for regulating the pressure.

It further consists in providing a sight-gage therefor.

It further consists of novel details of construction, all as will be hereinafter set forth.

The figure represents a partial side elevation, partial sectional view, of oil-filtering and oiling device embodying my invention.

As above stated, my invention relates to an oiling system which consists in providing means for receiving the "drip," &c., from a journal or other point and conducting the same to a suitable storage chamber or reservoir, forcing the same therefrom, and heating the same and passing the thus-heated oil through a filter, from whence it is conducted to a suitable storage-chamber, from whence it can be used or conducted to any suitable point.

In carrying out my invention I employ certain mechanism, and in the accompanying drawing I have shown one form of the same, although I do not desire to be limited thereto.

A designates a storage vessel or chamber, and B a pipe leading therefrom, which is provided with a funnel or mouth C and which in the drawing is shown beneath a shaft D and pulley E thereon, it being evident that any number of pipes may lead into said chamber A from any suitable points, the object being to collect the drips and conduct them to the chamber.

F designates a pump in connection with the interior of the chamber A and which is adapted to force the oil from the chamber A into the pipe G, which communicates with a pipe H, which latter has a branch J leading therefrom, and passing through a heating-chamber K, in which is the coil of pipes L, receiving steam or other heating medium through the pipe N and discharging the same through the pipe M, said branch J discharging into a filtering-tube P, which is suitably secured to the walls of the heating-chamber K, from which said tube can be removed in order to reach the coil L or, if it is desired, to replace the tube P.

Q designates filtering material—such as bone, charcoal, absorbent cotton, or other suitable material—in said tube P, which also contains a perforated plunger R therein adapted to bear upon the upper surface of said material Q, the position of said plunger being regulated by a set-screw S, whereby the material can be compressed or allowed to expand, and thus alter or vary the resistance or pressure through which the oil must pass.

T designates a pipe leading from the upper portion of said tube P and after extending upward and downward discharges into the sight-gage U, a portion of which is formed of glass and contains a suitable fluid, such as water, through which the purified oil is adapted to pass, and out through the pipe V into the storage-chamber W or to a suitable point of consumption, said chamber W having any suitable outlet or discharge, as pipe X. In some cases it may be desired to have a double filtering, in which case the pipe H has a branch Y leading therefrom discharging into a filtering-tube Z and from thence into the gage U, the construction being the same as already described, it being seen that I use a valve A' in the pipe H and a valve B' in the pipe C', which connects the tube with the gage U, whereby I am enabled to cut out the second filter, if desired. It will be further noted that the said filter-tubes P and Z are easily removed, so that the same can be replaced, and in order that I may remove the tube P and permit the operation of the system to continue through the tube Z, I have provided valves D' and E', which can cut out the pipes J and T, so that the tube P can be removed and a new one replaced, it being evident from this that both filters or tubes can be used or one or the other, as desired.

The operation is as follows: The oil which falls into the cup C is conducted to the chamber A, from which it is forced by the pump F into the pipes G and H and conducted through the heating-chamber, which causes the same to be heated and to be thinned, so that it passes through the filtering-tube in this condition and thoroughly cleansed, the pressure of said material being varied by the set-screw S and plunger R, the purified oil passing up and down the pipe T through the gage U and into the chamber W ready for utilization, it being seen that by the construction of the pipe T a trap is formed, which prevents the escape of the water in said gage.

It will be evident that various changes may be made by those skilled in the art which will come within the scope of my invention, and I do not, therefore, desire to be limited in every instance to the exact construction I have shown and described.

Having thus described my invention, what I claim as new, and desire to secure by Letters Patent, is—

1. In a device for filtering oil, a storage-chamber, a filter, means for forcing the oil from said storage-chamber upward through said filter, a heating-chamber beneath said filter, means located in said chamber for heating the oil in its passage therethrough, and a storage-chamber connected with said filter at a point farthest from the heating-chamber.

2. In a device for filtering oil, a storage-chamber, a filter, means for forcing the oil from said storage-chamber upward through said filter, a heating-chamber beneath said filter, means located in said chamber for heating the oil in its passage therethrough, a storage-chamber connected with said filter at a point farthest from the heating-chamber, and a purifier and sight-gage interposed between and connected with said filter and storage-chamber.

3. In a device for filtering oil, a storage-chamber, a filter, means for forcing the oil from said storage-chamber upward through said filter, a heating-chamber beneath said filter, means located in said chamber for heating the oil in its passage therethrough, a storage-chamber connected with said filter at a point farthest from the heating-chamber, a purifier and sight-gage interposed between the filter and storage-chamber and a connection between said purifier and filter and embodying a trap.

4. In a device for filtering oil, a storage-chamber, a plurality of filters, means for forcing oil from said storage-chamber, a pipe common to said forcing means and filters, heating-chambers beneath the filters, branches from said pipe extending into the bottoms of the filters, a valve in said pipe intermediate said branches, a valve in one of said branches, means in said chambers around said branches for heating the oil in its passage therethrough, a storage-reservoir, a purifier connected therewith and trapped connections between said reservoir and said filters.

FRANCIS E. COLLINS.

Witnesses:
 JOHN A. WIEDERSHEIM,
 WM. CANER WIEDERSHEIM.